United States Patent
Kennedy et al.

(10) Patent No.: US 10,235,747 B2
(45) Date of Patent: Mar. 19, 2019

(54) SYSTEM AND METHOD FOR DETERMINING THE CURRENT PARAMETERS OF A ZOOMABLE CAMERA

(75) Inventors: Howard J. Kennedy, Hamilton Square, NJ (US); Smadar Gefen, Yardley, PA (US)

(73) Assignee: Disney Enterprises, Inc., Burbank, CA (US)

(*) Notice: Subject to any disclaimer, the term of this patent is extended or adjusted under 35 U.S.C. 154(b) by 319 days.

(21) Appl. No.: 13/416,801

(22) Filed: Mar. 9, 2012

(65) Prior Publication Data

US 2013/0235213 A1   Sep. 12, 2013

(51) Int. Cl.
*G06T 7/00* (2017.01)
*G06T 7/80* (2017.01)

(52) U.S. Cl.
CPC ............ *G06T 7/00* (2013.01); *G06T 7/85* (2017.01); *G06T 2207/10012* (2013.01); *G06T 2207/10148* (2013.01)

(58) Field of Classification Search
None
See application file for complete search history.

(56) References Cited

U.S. PATENT DOCUMENTS

| 2003/0156751 | A1* | 8/2003 | Lee | G06K 9/03 382/154 |
| 2006/0023073 | A1* | 2/2006 | Li et al. | 348/211.99 |
| 2010/0259624 | A1* | 10/2010 | Li et al. | 348/187 |
| 2011/0090344 | A1* | 4/2011 | Gefen et al. | 348/169 |
| 2012/0154599 | A1* | 6/2012 | Huang | H04N 5/232 348/169 |
| 2012/0327246 | A1* | 12/2012 | Senior et al. | 348/159 |

OTHER PUBLICATIONS

Ying et al. "Camera Calibration from a Circle and a Coplanar Point at Infinity with Applications to Sports Scenes Analyses", Proceedings of the 2007 IEEE/RSJ International Conference on Intelligent Robots and Systems, San Diego, CA, USA, Oct. 29-Nov. 2, 2007, 6 pages.

Kannala et al. "Algorithms for Computing a Planar Homography from Conics in Correspondence", 10 pages, British Machine Vision Conference, 2006.

Zhang, "A Flexible New Technique for Camera Calibration", IEEE Transactions on Pattern Analysis and Machine Intelligence, vol. 22, No. 11, Nov. 2000, pp. 1330-1334.

* cited by examiner

*Primary Examiner* — Samira Monshi
(74) *Attorney, Agent, or Firm* — Fay Kaplun & Marcin, LLP

(57) ABSTRACT

An accurate camera pose is determined by pairing a first camera with a second camera in proximity to one another, and by developing a known spatial relationship between them. An image from the first camera and an image from the second camera are analyzed to determine corresponding features in both images, and a relative homography is calculated from these corresponding features. A relative parameter, such as a focal length or an extrinsic parameter is used to calculate a first camera's parameter based on a second camera's parameter and the relative homography.

21 Claims, 2 Drawing Sheets

SYSTEM AND METHOD FOR DETERMINING THE CURRENT PARAMETERS OF A ZOOMABLE CAMERA

FIELD OF THE INVENTION

The exemplary embodiments relate to systems and methods for determining the focal length of a first camera based on the focal length of a second camera positioned in proximity to the first camera.

BACKGROUND INFORMATION

An accurate camera pose is essential information in many systems, for example, in camera systems intended to broadcast sporting events at stadiums. Some elements of a camera pose (e.g., pan, tilt, roll, position) are sometimes known, fixed, or obtainable with inexpensive sensors. Pan means translation; roll means rotation. The current or instantaneous focal length of a zoomable camera is less frequently available, or of insufficient precision for many applications. In cameras that make their current focal length externally available, the resolution and/or absolute accuracy of the data may be too low for the application that requires focal length data. Thus, using a zoomable camera that outputs its focal length has proven to be unreliable and problematic.

In some cases, a portion or an entirety of the elements of a first camera pose can be determined by comparing the current view of the first camera with one or more static images or models of a scene, possibly derived from cameras beforehand. In some other cases, a portion or entirety of the elements of a first camera pose can be determined by comparing the current view of the first camera with concurrent images from one or more additional cameras, some of whose parameters are known. The extrinsic parameters of a camera include pan, roll, tilt, camera position, etc. This technique can be more useful than basing the determination on predetermined static images or scene models, since it can adapt to changes in lighting or background.

Many systems rely upon visual recognition of pre-determined scenes to solve for focal length (and other camera parameters). However, when the current scene is not a pre-determined, expected scene, a camera pose is not calculable. This may also occur when the camera is pointed away from a pre-determined scene (for instance, pointing at the audience), or when the camera is zoomed so far in or out that either expected fiducials are too few in number, or so small that they are unusable, or are occluded by foreground objects.

Typically, positions of landmarks in the scene are represented by a 3D Model. At intermediate zoom levels, the landmark position points of the model may be matched with their corresponding feature points from the current video image. Based on these pairs of corresponding points a homography (projective mapping between planar points from a 3D space and their projection in the image space) is calculated. Then, camera parameters are estimated based on the calculated homography. Pre-determined landmarks imply the need for a scene model. This is often inconvenient, or impossible. Nevertheless, a relative homography (or the homography) may be established between zoom-invariant, but ad-hoc feature points in simultaneous views of the same scene from two cameras.

DETAILED DESCRIPTION

Figure 1:
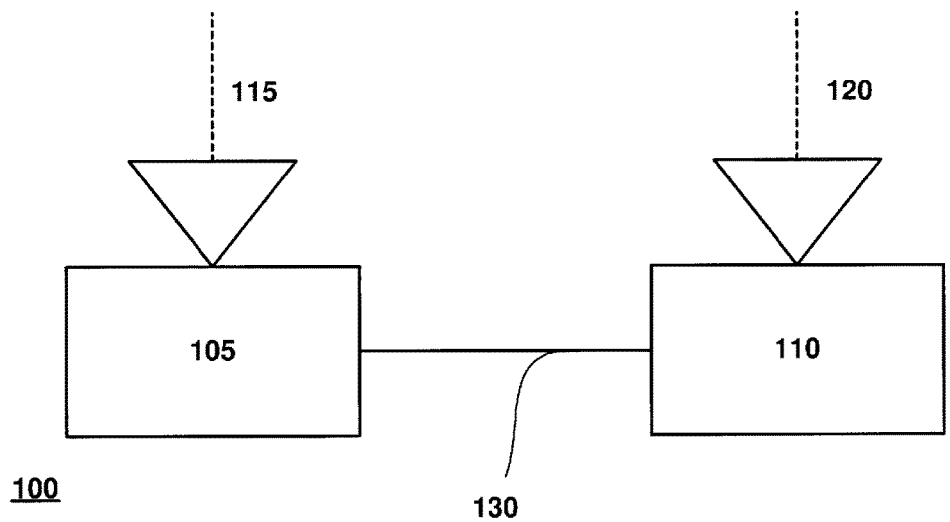
FIG. 1 is a schematic diagram of a system for determining the focal length of a zoomable camera.

The exemplary embodiments may be further understood with reference to the following description of the exemplary embodiments and the related appended drawings, wherein like elements are provided with the same reference numerals. The exemplary embodiments are related to systems and methods for detecting objects in a video image sequence. The exemplary embodiments are described in relation to the detection of players in a sporting event performing on a playing surface, but the present invention encompasses as well systems and methods where determination of a camera focal length is required for accurate and visually desirable imaging of a static or dynamic scene. The exemplary embodiments may be advantageously implemented using one or more computer programs executing on a computer system having a processor or central processing unit, such as, for example, a computer using an Intel-based CPU, such as a Pentium or Celeron, running an operating system such as the WINDOWS or LINUX operating systems, having a memory, such as, for example, a hard drive, RAM, ROM, a compact disc, magneto-optical storage device, and/or fixed or removable media, and having a one or more user interface devices, such as, for example, computer terminals, personal computers, laptop computers, and/or handheld devices, with an input means, such as, for example, a keyboard, mouse, pointing device, and/or microphone.

An exemplary embodiment proposes to use a pair of cameras positioned in proximity to each other and with a known spatial mapping between their optical axes. This spatial mapping may be derived from the relative homography, as will be explained in detail below. The relative homography calculation is based on corresponding feature pairs, where correspondence is between a first camera's image projection and a second camera's image projection of the same landmark from the scene. An absolute homography computation is based on corresponding feature pairs, where correspondence is between a landmark at the scene model (e.g. landmark's real-world position) and its projection in the camera image. Although the embodiment is described in connection with one wide field-of-view camera (the second camera), there may be associated with the zoomable camera more than one WFOV camera. Although the preferred embodiment is discussed within the context of these cameras being used for coverage of a sporting event, it is to be understood that the exemplary embodiments are applicable to other contexts, such as, for example virtual world applications like augmented reality, virtual studio applications, etc. In the sports coverage example, the first camera tends to zoom in and out frequently, so that there may be large discrepancies in focal length between the first and second cameras. Matching corresponding features from two images with large differences in scale may be challenging. In addition to the discrepancy in scale, the problem may be complicated by the number and types of features that are to be reliably extracted and matched at a certain camera view. In the preferred embodiment, the first camera is a zoom-able camera, while the second camera has a fixed focal length and is set to capture a wide field-of-view of the scene. The first and second cameras share approximate pan, tilt, roll, and position pose elements, but not focal length. The focal length of the first camera may be calculated from 1) the known focal length of the second camera and 2) the relative homography between the first and second cameras generated from corresponding features extracted from images taken by these two cameras.

The features that may be used in the homography calculation include, for example, key-points, lines, and conics. These geometrical features are invariant under projective mapping (for example a conic projectively maps to a second corresponding conic). Note that in order to establish correspondence between two geometrical features, various image analysis methods may be employed, such as computing metrics based on the texture or color statistics of local pixels. In this disclosure, a combination of extractable key-points, lines, and conics, is utilized to solve for the homography via a linear equation system as explained in further detail below.

FIG. 1 is a schematic diagram of a system 100 for determining the focal length of a zoomable camera. In FIG. 1, first camera 105 is zoomable, and second camera 110 is not, having instead a fixed focal length and set to a field of view wide enough to capture enough fiducials to enable a calculation of a homography based on common geometric features between the images of the cameras 105, 110 (described below). Cameras 105, 110 may be attached to one another, through a mechanical connection 130, such that translations and rotations experienced by the first camera 105 are duplicated simultaneously in the second camera 110, and aligned such that the optical axes 115, 120 of cameras 105, 110 are parallel (as illustrated in FIG. 1), or are arranged according to some other relative orientation to one another that is known. Alternatively, cameras 105, 110 need not be physically attached to one another, so long as the spatial relation (or a rigid transformation) that maps one camera to another is extractable. In this alternative, the cameras 105, 110 are approximately co-located, but otherwise may be oriented differently as long as cameras 105, 110 cover enough corresponding features to calculate the homography. Note that, in the case where first camera and second camera are mechanically attached, due to vibrations or other practical reasons, there may still be a differential relative orientation that should be accounted for (meaning to receive an accurate result when calculating the first camera focal length, one should also model possible discrepancies in relative panning, tilting, or rolling between the two cameras).

Figure 2:
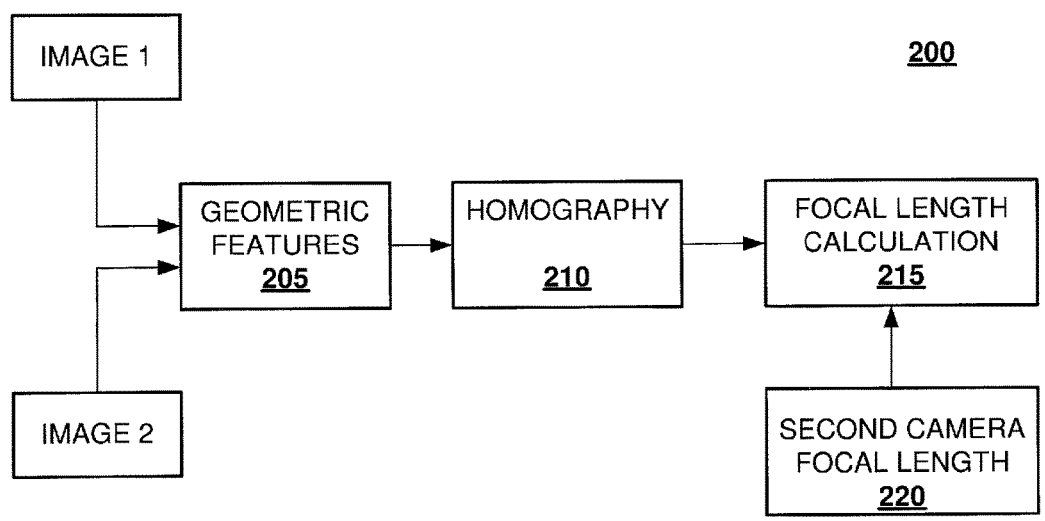
FIG. 2 shows a functional block diagram illustrating a focal length calculating arrangement for calculating the focal length of a first camera.

FIG. 2 shows a functional block diagram illustrating a focal length calculating arrangement 200 for calculating the focal length of the first camera 105. In terms of a hardware implementation, the various modules illustrated collectively FIG. 2 may be embodied as a single processing device, such as a suitable programmed microprocessor, or as a system on a chip, ASIC, or any other programmable arrangement. Arrangement 200 may be housed inside either of cameras 105 or 110, or it may be located remotely in a media truck at the sporting venue or a broadcast studio. In the case of a remotely located arrangement, 200, the various information on camera pose elements may be transmitted to arrangement 200 either wirelessly through any suitable transmission medium (RF, IR, ultrasonic), through a direct wired connection, through a network like an ETHERNET network, or through the Internet.

The image from first camera 105 and the image from second camera 110 are supplied to a module 205 for determining the corresponding geometric features of the two images. These corresponding features may include, for example, points, lines, and conics from both images. The extraction and matching between these corresponding features may be accomplished according to any suitable method known in the art. For example, a known in the art method such as SIFT (Scale-Invariant Feature Transformation) or SURF (Speeded Up Robust Feature) may be used.

The extracted corresponding features are supplied to a linear homography calculating module 210. The particular technique for calculating the homography depends on the particular category of common feature extracted from the images. For instance, known methods linearly estimate the homography matrix based on corresponding set of points and/or lines. Some methods estimate the homography based on corresponding set of conics. In practice, as the camera 105 steers and zooms in order to cover an action of an event, at times, the available projected features (key-points, lines, or conics) are sparse. Therefore, a robust (linear) method that estimates the homography out of any currently available combination of features is advantageous and described in detail below.

The homography calculating module 210 receives from module 205 a combination of corresponding pairs of points, lines, and/or conics from two planar images from cameras 105, 110. As shown in the table below, a point, a line, and a conic extracted from a first image I, when undergoing projective mapping $H_{3\times 3}$ onto image I' preserve their geometric properties. Meaning a point, a line, and a conic are invariant under the projective mapping (a point maps into a point, a line maps into a line, and a conic maps into a conic).

| A Point | A Line | A Conic |
|---|---|---|
| $X' = H \cdot X$ <br> Where | $l' = H^{-T} \cdot l$ <br> Where | $C' = H^{-T} C^{-T} \cdot H^{-1}$ <br> Where |
| $X = (x, y, 1)^T; X \in I$ | $l = (a, b, c)^T; l \in I$ | $C = \begin{bmatrix} a & b & d \\ b & c & e \\ d & e & f \end{bmatrix}; C \in I$ |
| $X' = (x', y', 1)^T; X' \in I'$ | $l' = (a, b, c)^T; l' \in I'$ | $C' = \begin{bmatrix} a' & b' & d' \\ b' & c' & e' \\ d' & e' & f' \end{bmatrix}; C' \in I'$ |

An estimate for the homography is determined by solving a homogeneous equation system: $M \cdot h = 0$, where h is a concatenation of H's rows: $h^T = [h_{11}, h_{12}, h_{13}, h_{21}, h_{22}, h_{23}, h_{31}, h_{32}, h_{33}]$ and M is derived from the given corresponding features in I and I' as is explained below for the cases of corresponding 1) pair of points, 2) pair of lines, and 3) two pairs of conics.

With regard to homogenous equations from a pair of corresponding points X and X', under projective mapping there exists $X' = H \cdot X$. Employing the cross product of X' on both sides of the equations yields: $X' \times X' = X' \times H \cdot X$. Since by definition $X' \times X' = 0$, $X' \times H \cdot X = 0$. The form $X' \times H \cdot X = 0$ can be written as $M \cdot h = 0$ where M may be derived as follows:

$$M \equiv \begin{bmatrix} 0 & 0 & 0 & -X'_3 X_1 & -X'_3 X_2 & -X'_3 X_3 & X'_2 X_1 & X'_2 X_2 & X'_2 X_3 \\ X'_3 X_1 & X'_3 X_2 & X'_3 X_3 & 0 & 0 & 0 & -X'_1 X_1 & -X'_1 X_2 & -X'_1 X_3 \\ -X'_2 X_1 & -X'_2 X_2 & -X'_2 X_3 & X'_1 X_1 & X'_1 X_2 & X'_1 X_3 & 0 & 0 & 0 \end{bmatrix}$$

Note that only two equations are linearly independent.

With regard to homogenous equations derived from a pair of corresponding lines, l and l', under projective mapping there exists $l'=H^{-T} \cdot l$. Employing the cross product of l' on both sides of the equation yields: $l' \times l' = l' \times (H^{-T} \cdot l)$. Since by definition $l' \times l' = 0$, $l' \times (H^{-T} \cdot l) = 0$. The form $l' \times (H^{-T} \cdot l) = 0$ can be written as $M \cdot h = 0$, where M may be derived as follows:

$$M \equiv \begin{bmatrix} 0 & -l_3 l'_1 & l_2 l'_1 & 0 & -l_3 l'_2 & l_2 l'_2 & 0 & -l_3 l'_3 & l_2 l'_3 \\ l_3 l'_1 & 0 & -l_1 l'_1 & l_3 l'_2 & 0 & -l_1 l'_2 & l_3 l'_3 & 0 & -l_1 l'_3 \\ -l_2 l'_1 & l_1 l'_1 & 0 & -l_2 l'_2 & l_1 l'_2 & 0 & -l_2 l'_3 & l_1 l'_3 & 0 \end{bmatrix}$$

Note that only two equations are linearly independent.

With regard to homogenous equations derived from two pairs of corresponding conics $C_1$, $C_2$ and $C_1'$, $C_2'$, and assuming non-degenerative conics (i.e. determinant $det(C) \neq 0$) corresponding conics are related as follows:

$$s_1 \cdot C_1 = H^T C_1' \cdot H$$

$$s_2 \cdot C_2 = H^T C_2' \cdot H$$

Computing the determinant, $s_i^3 \cdot det(C_i) = det(C_i') \cdot det(H)^2$, and then setting $det(H)^2 = 1$ results in: $s_i = (det(C_i')/det(C_i))^{1/3}$. Hence, $C_i$ and $C_i'$ are normalized so that $det(C_i) = det(C_i')$. The normalized conics satisfy:

$$C_1 = H^T \cdot C_1' \cdot H$$

$$C_2 = H^T \cdot C_2' \cdot H$$

Multiplying the inverse of first equation with the second equation results:

$$C_1^{-1} \cdot C_2 = H^{-1} \cdot C_1'^{-1} \cdot C_2' \cdot H$$

And then multiplying both sides by H yields a linear system with respect to the element of H:

$$C_1'^{-1} \cdot C_2' \cdot H - H \cdot C_1^{-1} \cdot C_2 = 0$$

Or $$A \cdot H - H \cdot B = M \cdot h = 0$$

Where, M may be derived as follows:

$$M \equiv \begin{bmatrix} M_{11} & M_{12} & M_{13} & A_{12} & A_{12} & A_{12} & A_{13} & A_{13} & A_{13} \\ A_{21} & A_{21} & A_{21} & M_{24} & M_{25} & M_{26} & A_{23} & A_{23} & A_{23} \\ A_{31} & A_{31} & A_{31} & A_{32} & A_{32} & A_{32} & M_{37} & M_{38} & M_{39} \end{bmatrix},$$

and where,
$M_{11}=A_{11}-B_{11}-B_{12}-B_{13}$, $M_{12}=A_{11}-B_{21}-B_{22}-B_{23}$,
$M_{13}=A_{11}-B_{31}-B_{32}-B_{33}$, $M_{24}=A_{22}-B_{11}-B_{12}-B_{13}$,
$M_{25}=A_{22}-B_{21}-B_{22}-B_{23}$, $M_{26}=A_{22}-B_{31}-B_{32}-B_{33}$,
$M_{37}=A_{33}-B_{11}-B_{12}-B_{13}$, $M_{38}=A_{33}-B_{21}-B_{22}-B_{23}$, and
$M_{39}=A_{33}-B_{31}-B_{32}-B_{33}$.

In this case, all three equations are linearly independent.

The following shall discuss determining minimum features for a unique solution (up to a scale) for the system $M \cdot h = 0$. In order to determine a unique solution, the rank of M should be eight, meaning the number of independent equations should be at least 8. Since a pair of corresponding points results in two independent equations, a pair of corresponding lines results in two independent equations, and two pairs of corresponding conics result in three independent equations, any combination of corresponding lines, points, and conics that result in at least 8 linear equations will be sufficient for the computation of h (except for the combination of two lines and two points). Therefore, many possible combinations of corresponding features from the pair of images for satisfying the eight linear equation are possible. For instance, one pair of points (one from each image), together with three pairs of corresponding lines (or vice versa) would produce eight independent equations. Similarly, two pairs of corresponding points, one pair of corresponding lines, and two pairs of corresponding conics (yielding three equations) would produce nine available independent equations. Determining such combinations of eight equations is done for each frame of the images from cameras 105 and 110. Thus, for a first pair of frames from the cameras, the eight equations may consist of equations from a pair of corresponding points in the first pair of images and equations from three pairs of corresponding lines in the first pair of images. For the next pair of frames, the eight equations may be determined from a different combination of corresponding features. In the case where accurate relative spatial orientation between the two cameras is given (or, for example, a subset of the parameters: relative pan, relative tilt, and relative roll is given), fewer corresponding feature pairs (i.e. fewer independent equations) are needed to solve for the first camera focal length. For example, when the relative orientation is fully known, two pairs of corresponding features are sufficient to calculate the relative focal length.

Once a unique solution is determined for the relative homography of a concurrent pair of frames of the two camera images, the absolute focal length of the first camera 105 can be determined. Specifically, once the relative homography for the current frames of the images from cameras 105, 110 is determined, it will contain the relative focal length between the two cameras 105, 110. That is, the relative focal length taken from the relative homography is the ratio of the apparent focal length of the first camera 105 with the known focal length of the second camera 110. Once this ratio is known, the absolute focal length of the first camera 105 is determined by multiplying the ratio by the absolute focal length of the second camera 110.

Figure 3:
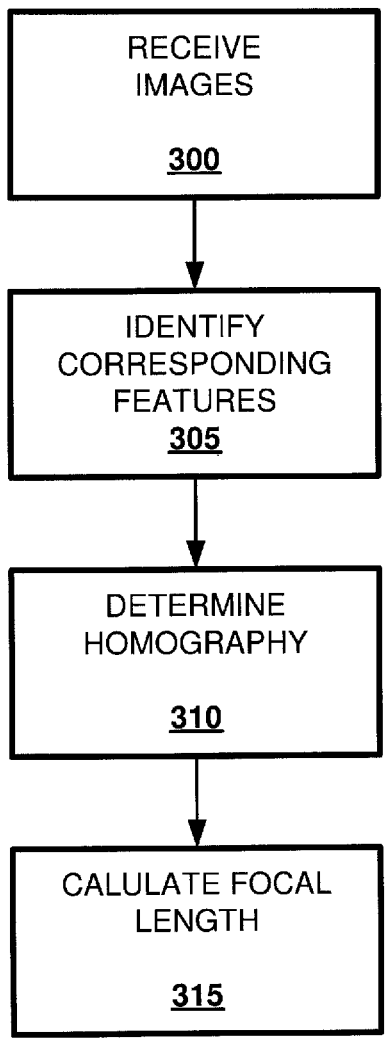
FIG. 3 is a flow diagram illustrating the method for determining the absolute focal length of the first camera 105.

FIG. 3 is a flow diagram illustrating the method for determining the absolute focal length of the first camera 105. Step 300 involves receiving a current frame of a first image from camera 105 and a current frame of a second image from second camera 110. In step 305, corresponding geometrical features from the current frames are determined. As explained above, combinations of corresponding points, lines, and conics are determined continually to generate, for the general case, at least eight independent equations. Once the equations are determined, they are used in Step 310 to compute a unique solution for the relative homography H. The relative homography includes the relative focal length between the cameras 105, 110. The homography provides the ratio of focal lengths, that is, the relative focal length. Once the relative focal length is known, it is multiplied by the known focal length of camera 110 to determine the absolute focal length of camera 105. The method has been described as a single instance of focal length determination, but this method can be repeated as often as is needed. For instance, the focal length calculation can be performed for every frame of the images produced by cameras 105, 110, every other frame, or as often or as infrequently as the particular application requires. For instance, in an application requiring frequent changes of the focal length of camera 105, the exemplary embodiments can be keep track of the focal length changes by calculating the focal length on a periodic basis, with the period between calculations being determined according to the necessities of the particular application.

The exemplary embodiments can work with any camera/lens without modification. Moreover, the exemplary embodiments achieve the purpose of determining a focal length for a first camera that is attached to a second camera even if the observed scene does not match a known model. This situation may result if the observed scene contains too few, or no, known fiducials. In some applications, some or all of pan, tilt, roll, and position may be fixed, known, or available from sensors. The addition of current focal length according to the exemplary embodiments can provide a full camera pose, without recourse to visual model-matching. The exemplary embodiments can enable a model-matching system to determine a full first camera pose, even if the first camera cannot view enough fiducials to form a model. If the second camera's field of view is set to a wide-enough field of view to capture enough fiducials to form a model, the second camera model will determine translation and rotation which is shared by the first camera (since they may be attached). Then, the first camera's calculated focal length is substituted for the second camera's focal length. With regard to the linear computation of the homography from any available combination of corresponding keypoints, lines, and/or conics (e.g., common features in a game arena), once the homography is known the camera model may be estimated based on methods known in the prior art.

Typically, the second camera is set to capture a wide view of the scene, and, relative to the first camera, may be steered slowly without rapid changes in orientation and zoom level. Thus, second camera's parameters may be derived based on a known model of the scene, for example, the points (e.g. line intersections), lines and circles that constitute a Hockey rink. Due to the camera wide view, a combination of points, lines, and circles from the rink are likely to be concurrently captured within a video frame forming corresponding pairs (e.g. a line from the scene model of the rink corresponds to its projection in the video frame). Out of these corresponding pairs, an absolute homography may be calculated following the method described above for the relative homography. Out of this absolute homography, the second camera's parameter may be calculated following methods in the art.

What is claimed is:

1. A method, comprising:
   receiving a first image from a first camera;
   receiving a second image from a second camera, wherein the second camera is positioned with a relative orientation to the first camera;
   receiving a camera parameter of the second camera;
   determining a first set of corresponding feature pairs common to the first image and the second image;
   determining, based on the first set of corresponding feature pairs, a relative homography between the first image and the second image; and
   calculating a focal length of the first camera based on the relative homography and the camera parameter of the second camera.

2. The method of claim 1, wherein the camera parameter of the second camera is a focal length.

3. The method of claim 1, wherein the camera parameter of the second camera is an extrinsic parameter.

4. The method of claim 1, wherein the first set of corresponding feature pairs includes one of a set of common points, a set of common lines, a set of common conics, and a combination involving two or more of a set of common points, a set of common lines, and a set of common conics.

5. The method of claim 1, wherein the camera parameter of the second camera is computed based on:
   determining a second set of corresponding feature pairs common to the second image and a scene model;
   determining, based on the second set of corresponding feature pairs, an absolute homography between the second image and the scene model; and
   calculating the camera parameter of the second camera based on the absolute homography between the second image and the scene model.

6. The method of claim 5, wherein the second set of corresponding feature pairs includes one of a set of common points, a set of common lines, a set of common conics, and a combination involving two or more of a set of common points, a set of common lines, and a set of common conics.

7. The method of claim 1, wherein:
   the first set of corresponding feature pairs includes corresponding conics and at least one of corresponding points and corresponding lines; and
   the relative homography is determined by a linear homography calculating module based on the first set of corresponding feature pairs.

8. The method of claim 5, wherein:
   the second set of corresponding feature pairs includes corresponding conics and at least one of corresponding points and corresponding lines; and
   the absolute homography is determined by a linear homography calculating module based on the second set of corresponding feature pairs.

9. An integrated circuit, comprising:
   circuitry configured to determine a first set of corresponding feature pairs common to a first image and a second image, wherein determining the first set of corresponding feature pairs includes receiving the first image from a first camera and receiving the second image from a second camera, wherein the second camera is positioned with a relative orientation to the first camera;
   circuitry configured to determine, based on the first set of corresponding feature pairs, a relative homography between the first image and the second image; and
   circuitry configured to calculate a focal length of the first camera based on the relative homography and a camera parameter of the second camera.

10. The system of claim 9, wherein the camera parameter of the second camera is a focal length.

11. The system of claim 9, wherein the camera parameter of the second camera is an extrinsic parameter.

12. The system of claim 9, wherein the first set of corresponding feature pairs includes one of a set of common points, a set of common lines, a set of common conics, and a combination involving two or more of a set of common points, a set of common lines, and a set of common conics.

13. The system of claim 9, further comprising, circuitry configured to determine the camera parameter of the second camera, based on:
- determining a second set of corresponding feature pairs common to the second image and a scene model;
- determining, based on the second set of corresponding feature pairs, an absolute homography between the second image and the scene model; and
- calculating the camera parameter of the second camera based on the absolute homography between the second image and the scene model.

14. The system of claim 13, wherein the second set of corresponding feature pairs includes one of a set of common points, a set of common lines, a set of common conics, and a combination involving two or more of a set of common points, a set of common lines, and a set of common conics.

15. A non-transitory computer-readable medium containing instructions that when executed on a computing device results in a performance of the following:
- receiving a first image from a first camera;
- receiving a second image from a second camera, wherein the second camera is positioned with a relative orientation to the first camera;
- receiving a camera parameter of the second camera;
- determining a first set of corresponding feature pairs common to the first image and the second image;
- determining, based on the first set of corresponding feature pairs, a relative homography between the first image and the second image; and
- calculating a focal length of the first camera based on the relative homography and the camera parameter of the second camera.

16. The computer-readable medium of claim 15, wherein the camera parameter of the second camera is a focal length.

17. The computer-readable medium of claim 15, wherein the camera parameter of the second camera is an extrinsic parameter.

18. The computer-readable medium of claim 15, wherein the first set of corresponding feature pairs includes one of a set of common points, a set of common lines, a set of common conics, and a combination involving two or more of a set of common points, a set of common lines, and a set of common conics.

19. The computer-readable medium of claim 15, wherein the camera parameter of the second camera is computed based on:
- determining a second set of corresponding feature pairs common to the second image and a scene model;
- determining, based on the second set of corresponding feature pairs, an absolute homography between the second image and the scene model; and
- calculating the parameter of the second camera based on the absolute homography between the second image and the scene model.

20. The computer-readable medium of claim 19, wherein the second set of corresponding feature pairs includes one of a set of common points, a set of common lines, a set of common conics, and a combination involving two or more of a set of common points, a set of common lines, and a set of common conics.

21. A method, comprising:
- receiving a first image from a first camera;
- receiving a second image from a second camera, wherein the second camera is positioned with a relative orientation to the first camera;
- receiving a camera parameter of the second camera;
- determining a first set of corresponding feature pairs common to the first image and the second image, wherein the first set of corresponding feature pairs includes corresponding conics and at least one of corresponding points and corresponding lines;
- determining, by a linear homography calculating module, a relative homography between the first image and the second image based on the first set of corresponding feature pairs; and
- calculating a camera parameter of the first camera based on the relative homography and the camera parameter of the second camera.

* * * * *